US006633424B2

(12) United States Patent
Ueda

(10) Patent No.: US 6,633,424 B2
(45) Date of Patent: Oct. 14, 2003

(54) OPTICAL SCANNING DEVICE AND IMAGE FORMING APPARATUS USING THE SAME

(75) Inventor: Takeshi Ueda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/981,869

(22) Filed: Oct. 19, 2001

(65) Prior Publication Data

US 2002/0060829 A1 May 23, 2002

(30) Foreign Application Priority Data

Oct. 20, 2000 (JP) ........................................ 2000-320404

(51) Int. Cl.$^7$ ............................................... G02B 26/08
(52) U.S. Cl. ........................................ 359/212; 359/216
(58) Field of Search ................................. 359/212, 216; 347/259, 260

(56) References Cited

U.S. PATENT DOCUMENTS 5,903,379 A * 5/1999 Kamikubo ................... 359/212
6,400,488 B1 * 6/2002 Nagasaka et al. ........... 359/212

* cited by examiner

*Primary Examiner*—Euncha Cherry
(74) *Attorney, Agent, or Firm*—Oblon, Spivak, McClelland, Maier & Neustadt, P.C.

(57) ABSTRACT

An optical scanning device of the present invention includes at least one reflecting member intervening between a deflecting surface and a surface to be scanned. The device of the present invention effectively reduces the shading of the entire optics included therein by setting up unique conditions relating to the reflecting member.

10 Claims, 11 Drawing Sheets

Fig. 11

| SURFACE # | Rm RADIUS OF CURVATURE IN MERIDIONAL DIRECTION (mm) | Rs RADIUS OF CURVATURE IN SAGITTAL DIRECTION (mm) | X DISTANCE IN OPTICAL AXIS DIRECTION (mm) | Y DISTANCE PERPENDICULER TO OPTICAL AXIS (mm) | N REFRACTIVE INDEX A WAVELENGTH USED | NOTE |
|---|---|---|---|---|---|---|
| CENTER OF POLYGONAL MIRROR | — | — | 68.9 | 9.4 | | A 18mm |
| 1* | −312.6 | −312.6 | 31.4 | 0 | 1.524 | SCANNING LENS |
| 2* | −83.0 | −83.0 | 78.0 | −0.1 | | |
| 3** | −500 | −47.7 | 3.5 | 0 | 1.524 | SCANNING LENS |
| 4 | −1000 | 23.38 | 143.6 | 0 | | |
| 5 | — | — | — | — | | SUBJECT SURFACE |

LIGHT SOURCE WAVELENGTH : 780nm

Fig. 12

| OPTICAL ELEMENT | COATING LAYER |
|---|---|
| POLYGONAL MIRROR | ONE |
| SOUNDPROOF GLASS | TWO |
| 1ST FOCUSING LENS | NONE |
| 2ND FOCUSING LENS | NONE |
| 1ST RETURN MIRROR | FOUR |
| 2ND RETURN MIRROR | FOUR |
| 3RD RETURN MIRROR | TWO |
| DUSTPROOF GLASS | NONE |

OPTICAL SCANNING DEVICE AND IMAGE FORMING APPARATUS USING THE SAME

BACKGROUND OF THE INVENTION

1. Field of the Invention

The present invention relates to a laser beam printer, facsimile apparatus, digital copier or similar image forming apparatus and more particularly to an optical scanning device advantageously applicable to a color image forming apparatus including a plurality of photoconductive elements.

2. Description of the Background Art

An optical scanning device of the type including a semiconductor laser or similar light source, a polygonal mirror or similar deflector and focusing optics is customary with an image forming apparatus. The deflector deflects a light beam issuing from the light source with its deflecting faces at a constant angular velocity. The focusing optics focuses the light beam deflected by the deflector on a desired surface in the form of a beam spot at a constant velocity. There is an increasing demand for higher image quality and lower cost in relation to this type of scanning device. One of the problems with this type of scanning device is irregular image density ascribable to shading.

Specifically, when the deflector deflects the incident light beam with its deflecting faces, the angle of the reflected light beam incident to the focusing optics continuously varies during each time of deflection. Reflection optics including mirrors for bending or returning an optical path are arranged between the deflecting face and the surface to be scanned in accordance with the layout of the optics. Further, a soundproof glass for preventing noise ascribable to the rotation of the deflector and a dustproof glass for protecting the optics from dust are often arranged between the deflecting face and the surface to be scanned.

The reflectance of light varies in accordance with the incidence angle, as well known in the art. It follows that the reflectance of the light beam deflected by the soundproof glass, dustproof glass and return mirrors continuously varies due to deflection. Consequently, the intensity of the deflected light beam to reach the desired surface continuously varies each time of deflection. Shading refers to the variation of the intensity of the beam spot occurring during each time of deflection, i.e., during one line of scanning. Shading renders the density of a recorded image irregular and thereby lowers image quality. This is particularly true with a halftone image.

SUMMARY OF THE INVENTION

It is an object of the present invention to provide an optical scanning device capable of effectively reducing the shading of optics included therein to thereby enhance image quality, and an image forming apparatus using the same.

An optical scanning device of the present invention includes a light source, a deflecting surface for deflecting a light beam output from the light source, focusing optics for focusing the light beam deflected by the deflecting surface on a subject surface to be scanned, and at least one reflecting member intervening between the deflecting surface and the subject surface. The light beam incident to the deflecting surface and the optical axis of the focusing optics are angularly spaced from each other in a plane of polarization. Assume that that when a section in the subscanning direction is seen from a side where the light beam is incident to the deflecting surface, the inclination of the reflecting member relative to a plane perpendicular to the light beam is positive when clockwise and is $\Theta$ (°), and that a function f(i) is f(i)=1 when i is an even number or f(i)=−1 when i is an odd number. Also, assume that the direction of polarization of the light beam just after emission from the light source is inclined by an angle of $\theta$ relative to the main scanning direction. Further, assume that when the clockwise direction as seen from the rear of the light source is positive, the angle $\theta$ lies in a range of:

$0°<\theta<45°$ or $-90°<\theta<-45°$   (condition 1)

or $-45°<\theta<0°$ or $45°<\theta<90°$   (condition 2)

Then, when the condition 1 holds, the reflecting member is the "n" reflecting member, as counted from the light source in the direction of propagation of the light beam, except for the deflecting surface and satisfies a relation of $f(n)\times\Theta<0$. When the condition 2 holds, the reflecting member is the "n" reflecting member, as counted from the light source in the direction of beam propagation, except for the deflecting surface and satisfies a relation of $f(n)\times\Theta<0$.

BRIEF DESCRIPTION OF THE DRAWINGS

The above and other objects, features and advantages of the present invention will become more apparent from the following detailed description taken with the accompanying drawings in which:

FIG. 11 is a table listing data relating to optics that follow a deflector shown in FIGS. 7 and 8; and FIG. 12 is a table listing the coating conditions of the optical parts following the deflector.

DESCRIPTION OF THE PREFERRED EMBODIMENT

Figure 1:
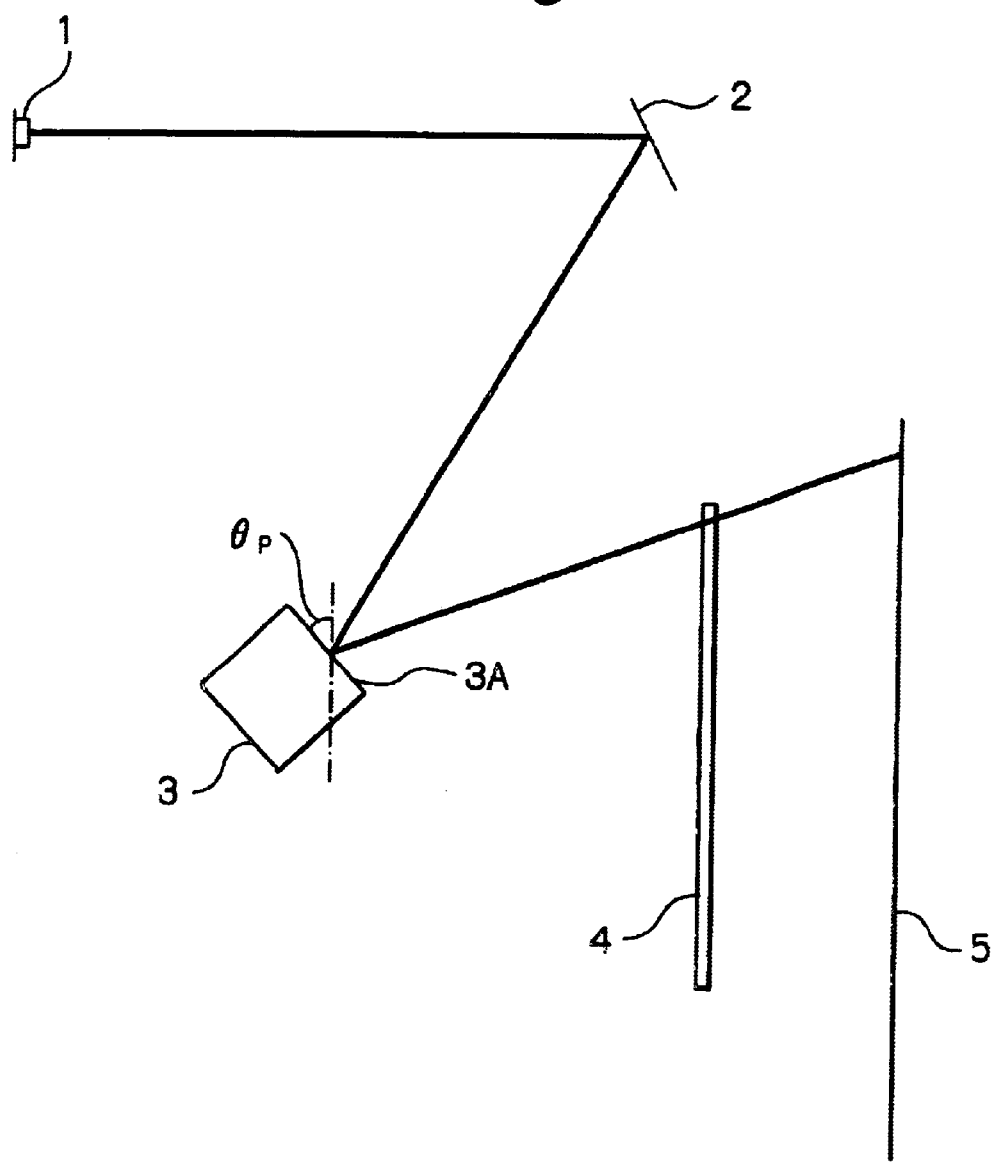
FIG. 1 is a view as seen in a direction corresponding to a main scanning direction, showing optics included in an optical scanning device embodying the present invention.

To better understand the present invention, the principle of the present invention will be described with reference to FIGS. 1 and 2, which show a specific configuration of an optical scanning device. As shown, the optical scanning device includes a semiconductor laser or similar light source 1, a mirror or reflecting member 2, a polygonal mirror 3 having a plurality of deflecting faces, a transparent, parallel flat plate 4, a return mirror 5. The parallel flat plate 4 is used as, e.g., a soundproof glass or a dustproof glass.

In operation, a light beam issuing from the light source 1 is transformed to substantially parallel beam by a coupling lens, not shown. The parallel beam is incident to the mirror 2 and obliquely reflected thereby toward the polygonal mirror 3, which is in rotation. The polygonal mirror 3 deflects the incident beam toward the return mirror 5 via the parallel flat plate 4. The return mirror 5 reflects the beam in a preselected direction toward a subject surface to be scanned, not shown.

Figure 6A:
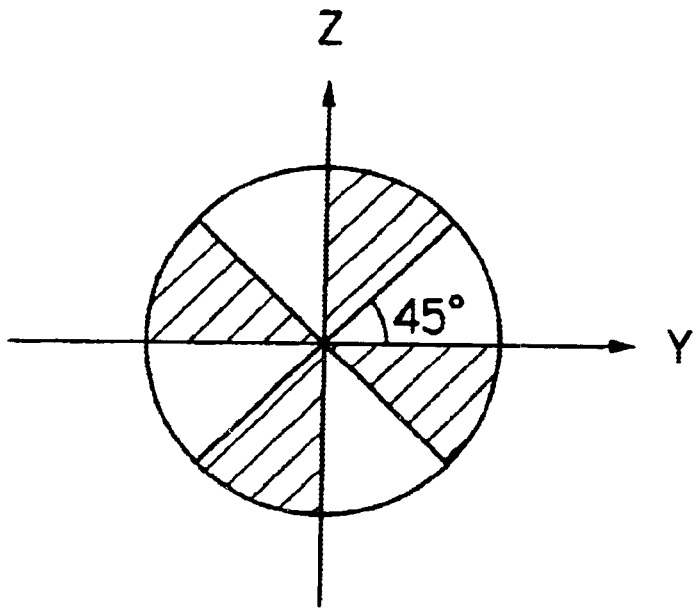
FIGS. 6A and 6B are views each showing a particular direction of polarization of a light beam issuing from a light source, which is also included in the illustrative embodiment, as seen from the rear of the light source.
Figure 6B:
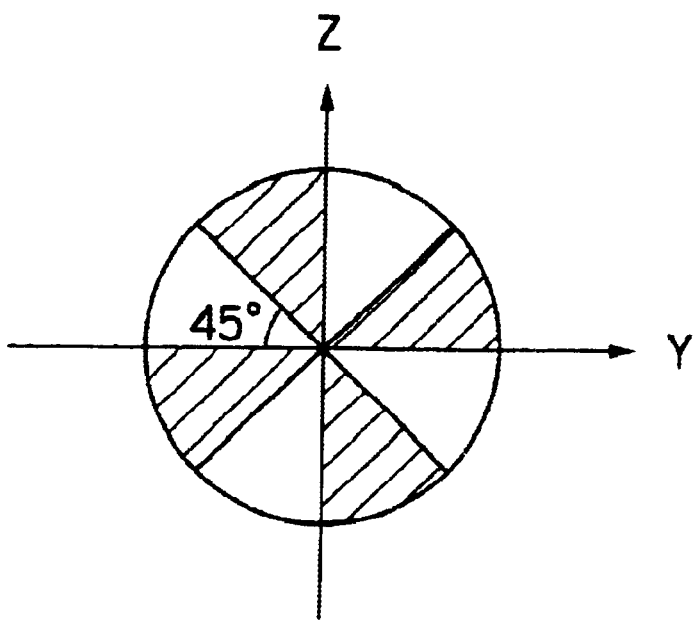

Assume that the direction in which the light beam issuing from the light source 1 is deflected is positive when clockwise, as seen from the rear of the light source 1. Also, assume that just after the emission from the light source 1, the light beam is deflected by an angle of $\theta°$ relative to the main scanning direction. Then, FIG. 6A shows a first condition in which a relation of $0°<\theta<45°$ or a relation of $-90°<\theta<45°$ holds. FIG. 6B shows a second condition in which a relation of $-45°<\theta<0°$ or a relation of $45°<\theta<90°$ holds. In FIGS. 6A and 6B, the Y axis is representative of the main scanning direction while a point where the Y and Z axes cross each other is representative of the light beam.

Figure 2:
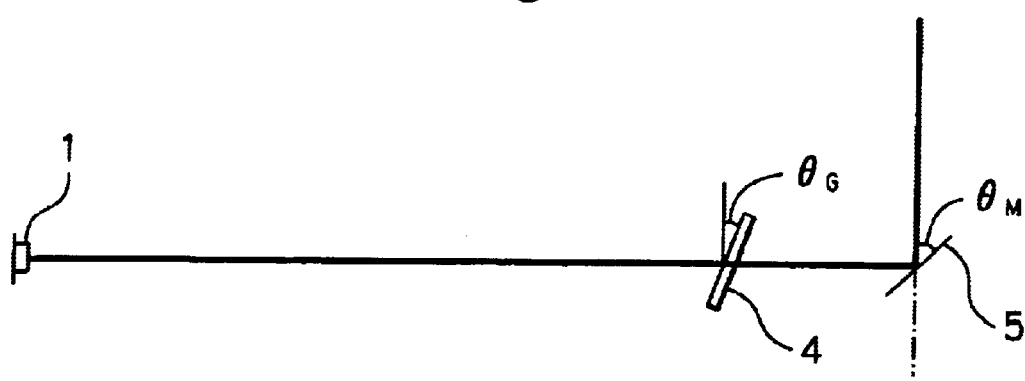
FIG. 2 is a view as seen in a direction corresponding to a subscanning direction, showing the illustrative embodiment.

Further, in FIG. 1, the rotation angle of the deflecting face of the polygonal mirror 3 is assumed to be positive when counterclockwise and represented by $\theta_P°$. As shown in FIG. 2, the angle of the parallel flat plate 4 relative to a plane perpendicular to the light beam is positive when clockwise and represented by $\theta_G°$, as viewed in a section in the subscanning direction. Further, as shown in FIG. 2, the deflection angle of the return mirror 5 is positive when clockwise and represented by $\theta_M°$, as viewed in a section in the subscanning direction.

Shading necessarily occurs somewhere in scanning optics unless a light beam is a circularly deflected light beam. In light of this, in accordance with the present invention, one optical element generates shading opposite to shading generated by another optical element, so that the shading of the entire optics is reduced.

Figure 3:
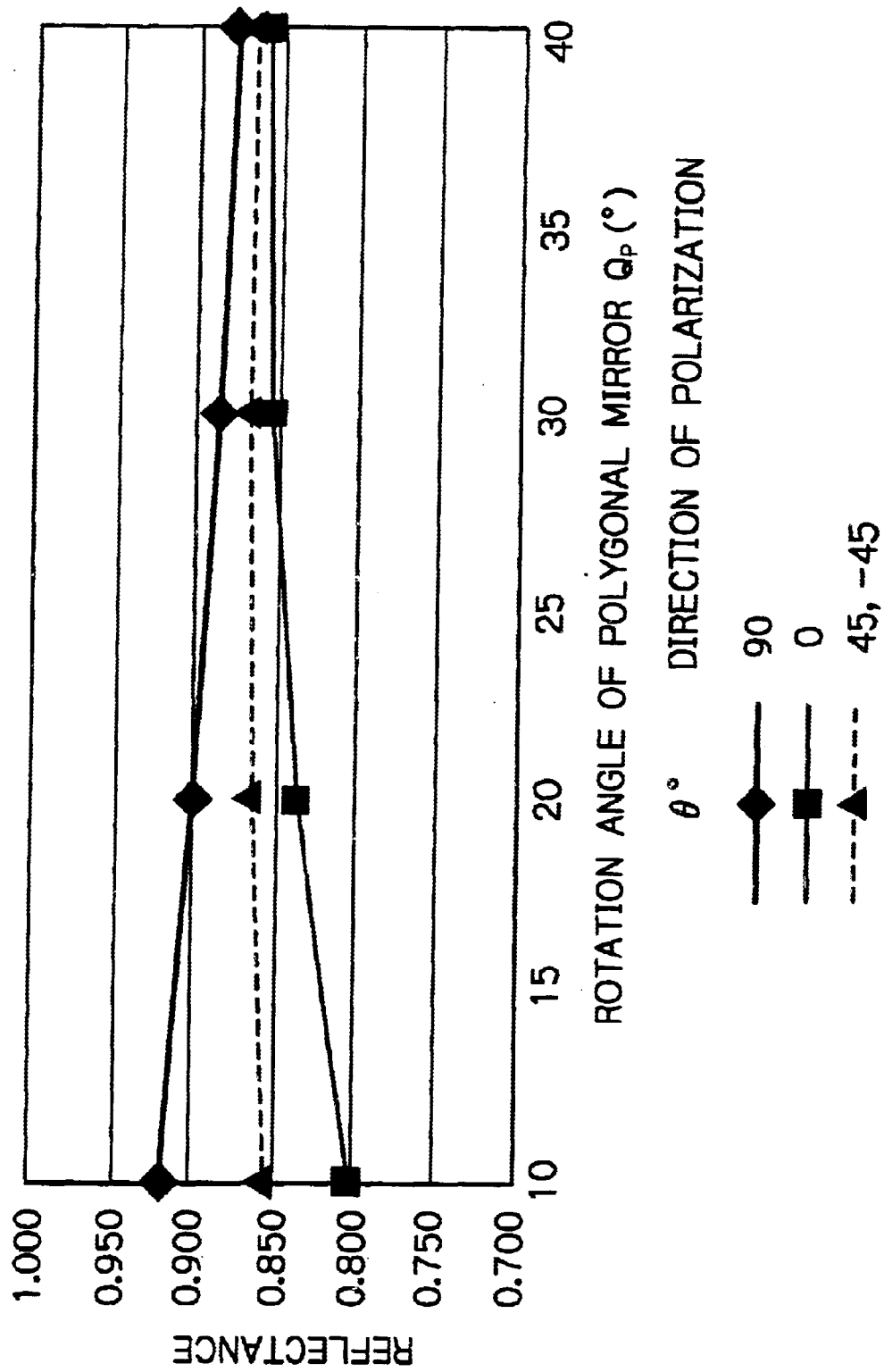
FIG. 3 is a graph showing a relation between the rotation angle of a polygonal mirror included in the illustrative embodiment and the reflectance of the polygonal mirror.
Figure 4:
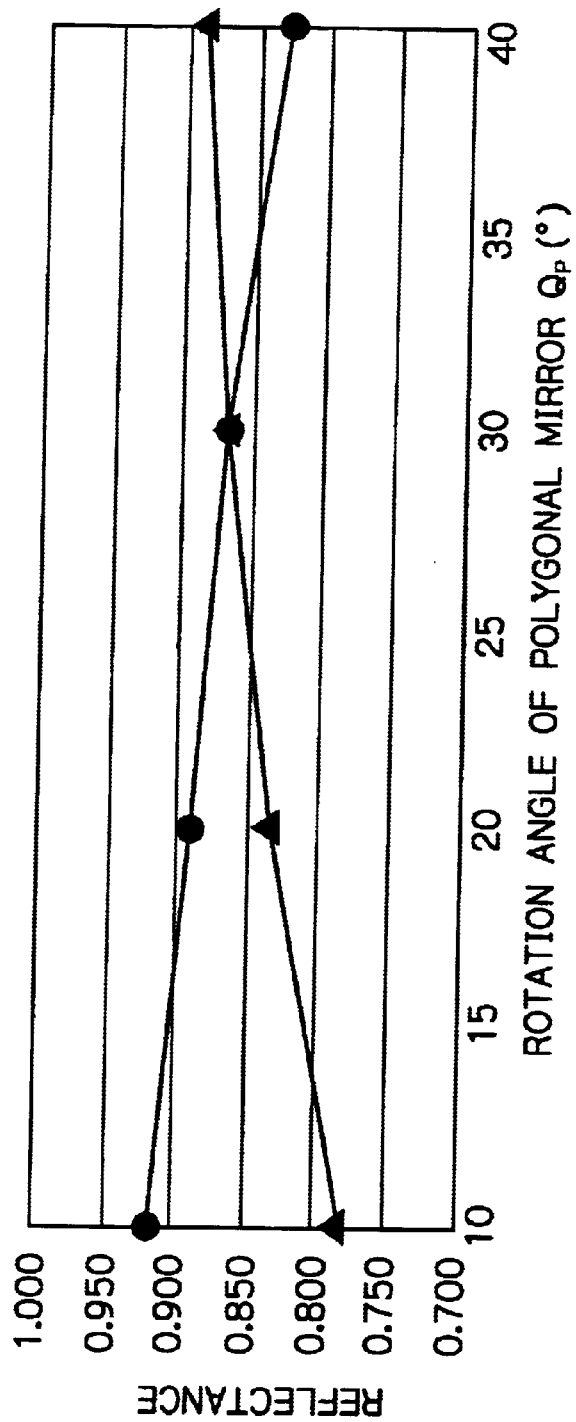
FIG. 4 is a graph showing a relation between the rotation angle of the polygonal mirror and the reflectance of a return mirror also included in the illustrative embodiment.
Figure 5:
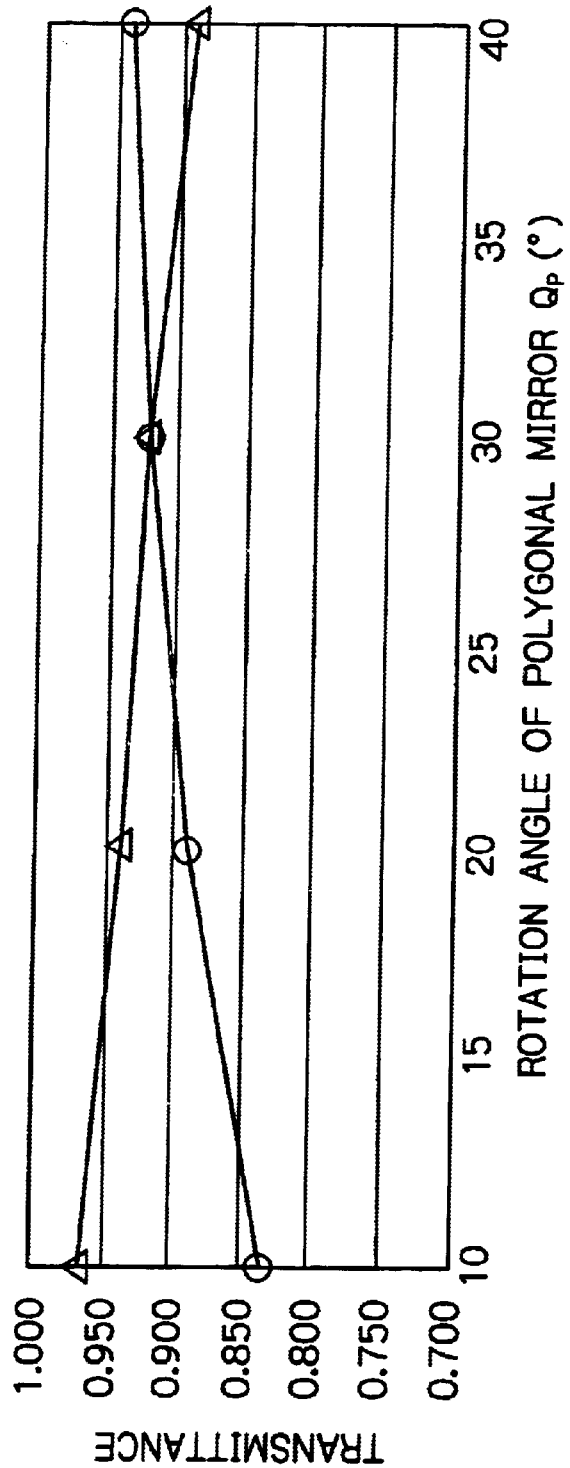
FIG. 5 is a graph showing a relation between the rotation angle of the polygonal mirror and the transmittance of a parallel flat plate also included in the illustrative embodiment.

FIG. 3 shows a relation between the rotation angle $\theta_P°$ and the reflectance of the deflecting face of the polygonal mirror 3. FIG. 4 shows a relation between the rotation angle $\theta_P°$ and the reflectance of the return mirror 5. FIG. 5 shows a relation between the rotation angle $\theta_P°$ and the reflectance of the parallel flat plate 4. The polygonal mirror 3 has an aluminum surface provided with a single coating layer. The parallel flat plate 4 is formed of glass without a coating layer. The return mirror 5 has a base with aluminum deposited thereon by vapor deposition and further provided with a single coating layer.

As shown in FIG. 3, the polygonal mirror 3 generates little shading if $|\theta|=45°$, but generates upward, rightward shading if $-45°<\theta<45°$ or upward, leftward shading if $45°<\theta<90°$.

As shown in FIG. 4, the return mirror 5 generates little shading if $\theta=0°$ or $90°$, but generates, in the range of $0°<\theta<90°$, upward, rightward shading if $\theta_M>0°$ or upward, leftward shading if $\theta_M<0°$. In the range of $-90°<\theta<0°$, the mirror 5 generates upward, leftward shading if $\theta_M>0°$ or upward, rightward shading if $\theta_M<0°$.

As shown in FIG. 5, the parallel flat plate 4 generates little shading if $\theta=0°$ or $90°$, but generates, in the range of $0°<\theta<90°$, upward, right shading if $\theta_P>0°$ or upward, leftward shading if $\theta_P<0°$. In the range of $-90°<\theta<0°$, the flat plate 4 generates upward, leftward shading if $\theta_P>0°$ or upward, rightward shading if $\theta_P<0°$ It will be seen that if $0°<\theta<45°$, which causes the polygonal mirror 3 to generate upward, rightward shading, then $\theta_M<0°$ is selected for the return mirror 5 in order to generate upward, leftward shading. This successfully reduces the shading of the entire optics.

Assume that the angle of a reflecting member relative to a plane perpendicular to an incident beam is positive when clockwise and represented by $\Theta°$, as seen in a section in the subscanning direction from the incidence side. Also, assume that a function f(i) is f(i)=1 if i is even or f(i)=−1 if it is odd. Further, assume that a reflecting member other than deflecting face as counted from the light source in the direction of beam propagation is an "n" reflecting member. Then, the return mirror 5 is the second (n=2) reflecting member; therefore f(2)=1. $\theta_M<0°$ equal to $\Theta=-\theta_M>0°$, and therefore $f(2)\times\Theta>0$ holds.

Shading decreases with an increase in the number of anti-reflection coating layers. It is therefore preferable to provide a reflecting member, which generates shading in the same direction as the polygonal mirror, with a greater number of coating layers in order to reduce the shading of the reflecting member. Likewise, it is preferable to provide a reflecting member, which generates shading in the opposite direction to the polygonal mirror, with a smaller number of coating layers for thereby canceling the shading ascribable to the polygonal mirror.

Alternatively, the number of reflecting members generating shading in the same direction as the polygonal mirror may be reduced in order to prevent the shading of the polygonal mirror from being intensified. Likewise, the number of reflecting members generating shading in the opposite direction to the polygonal mirror may be increased to cancel the shading of the polygonal mirror.

When $0°<\theta<45°$ holds, the polygonal mirror 3 generates upward, rightward shading. In this case, it is preferable to reduce the shading of the entire optics by providing the parallel flat plate 4 with $\theta_G>0°$, which generates upward, leftward shading.

The number of reflecting members (except for the deflecting face) intervening between the light source 1 and the parallel flat plate 4 is m=1, so that f(1)=−1 holds. $\theta_G<0°$ is represented by $\Theta=-\theta_G<0°$, so that $f(1)\times\Theta>0$ holds.

Shading decreases with an increase in the number of anti-reflection coating layers, as stated earlier. For this reason, as for a transparent, parallel flat plate generating shading in the same direction as the polygonal mirror, it is preferable to increase the number of coating layers for thereby reducing shading ascribable to the flat plate. As for a transparent, parallel flat plate generating shading in the opposite direction to the polygonal mirror, it is preferable to reduce the number of coating layers for thereby canceling shading ascribable to the polygonal mirror.

Further, shading increases with an increase in the inclination of a transparent, parallel flat plate. It is therefore preferable to increase the inclination of a transparent, parallel flat plate that generates shading in the opposite direction to the polygonal mirror, thereby canceling shading ascribable to the polygonal mirror.

The sign of the function f(i) changes in accordance whether a reflecting member is even or whether it is odd. This is because every time a light beam is reflected by a reflecting member, the direction of deflection is reversed relative to the direction of beam propagation.

Figure 7:
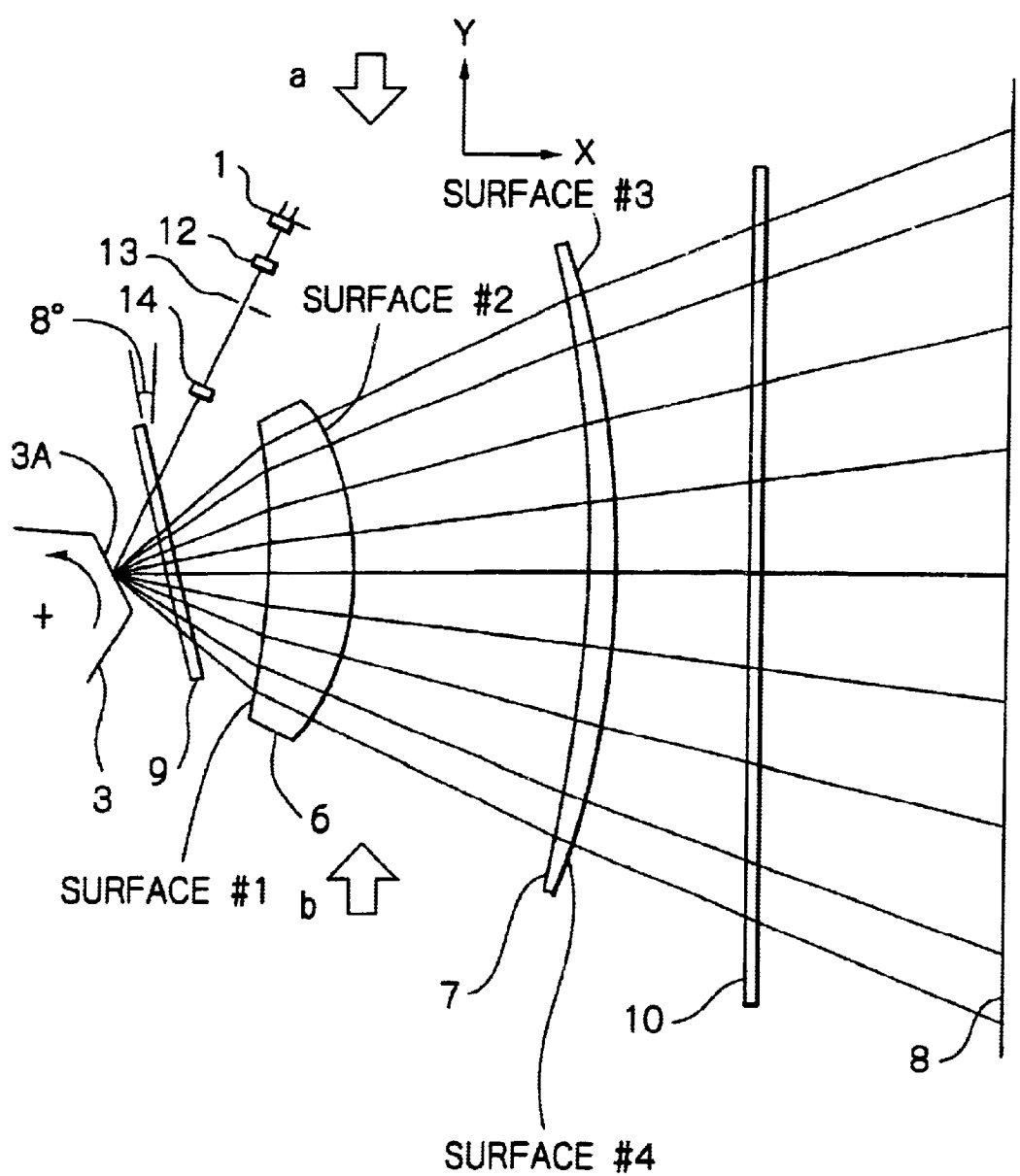
FIG. 7 is a plan view as seen in the direction corresponding to the main scanning direction, showing the illustrative embodiment together with an image forming apparatus using the same.
Figure 8:
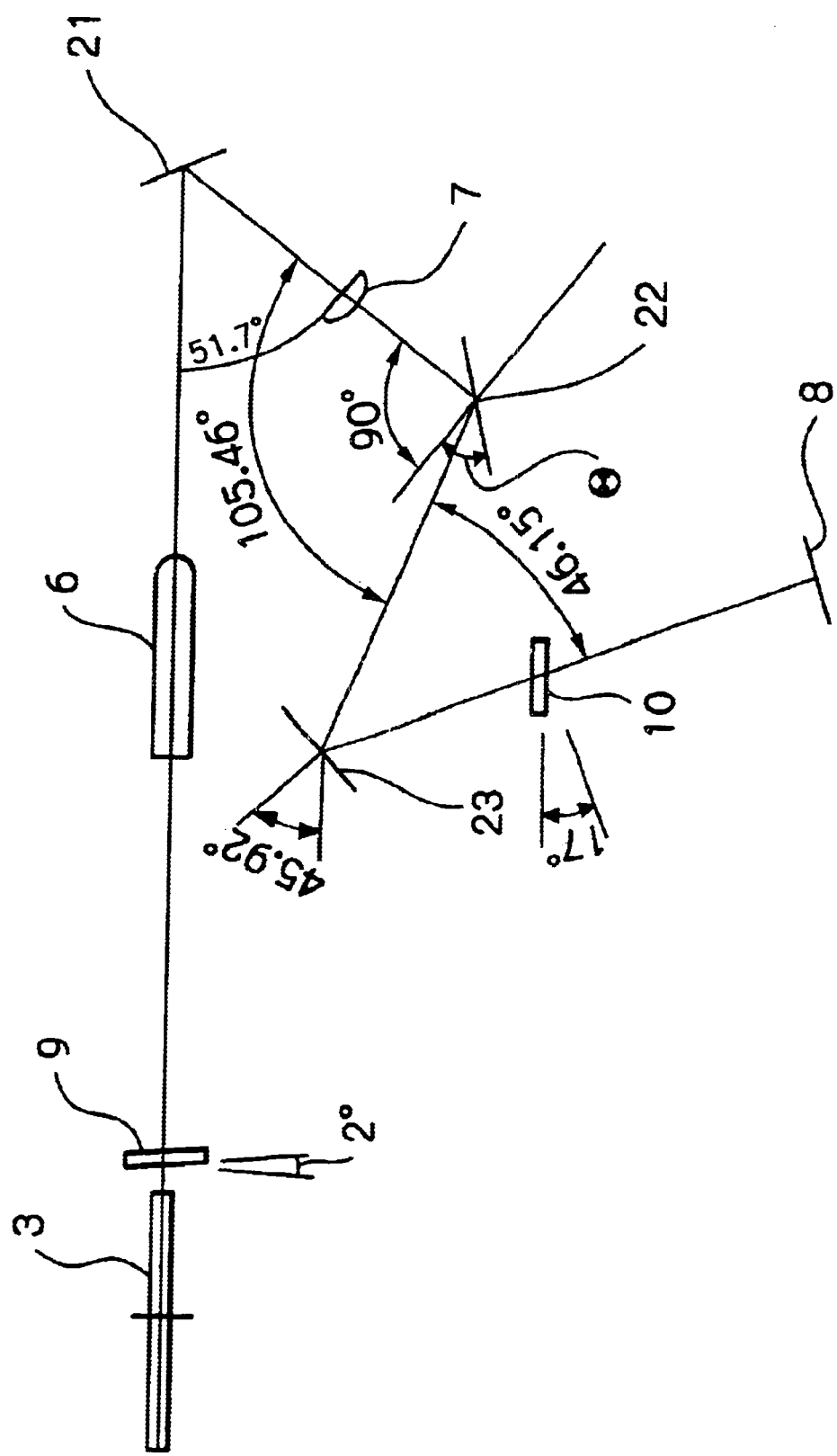
FIG. 8 is a side elevation showing the illustrative embodiment in the direction corresponding to the subscanning direction.
Figure 9:
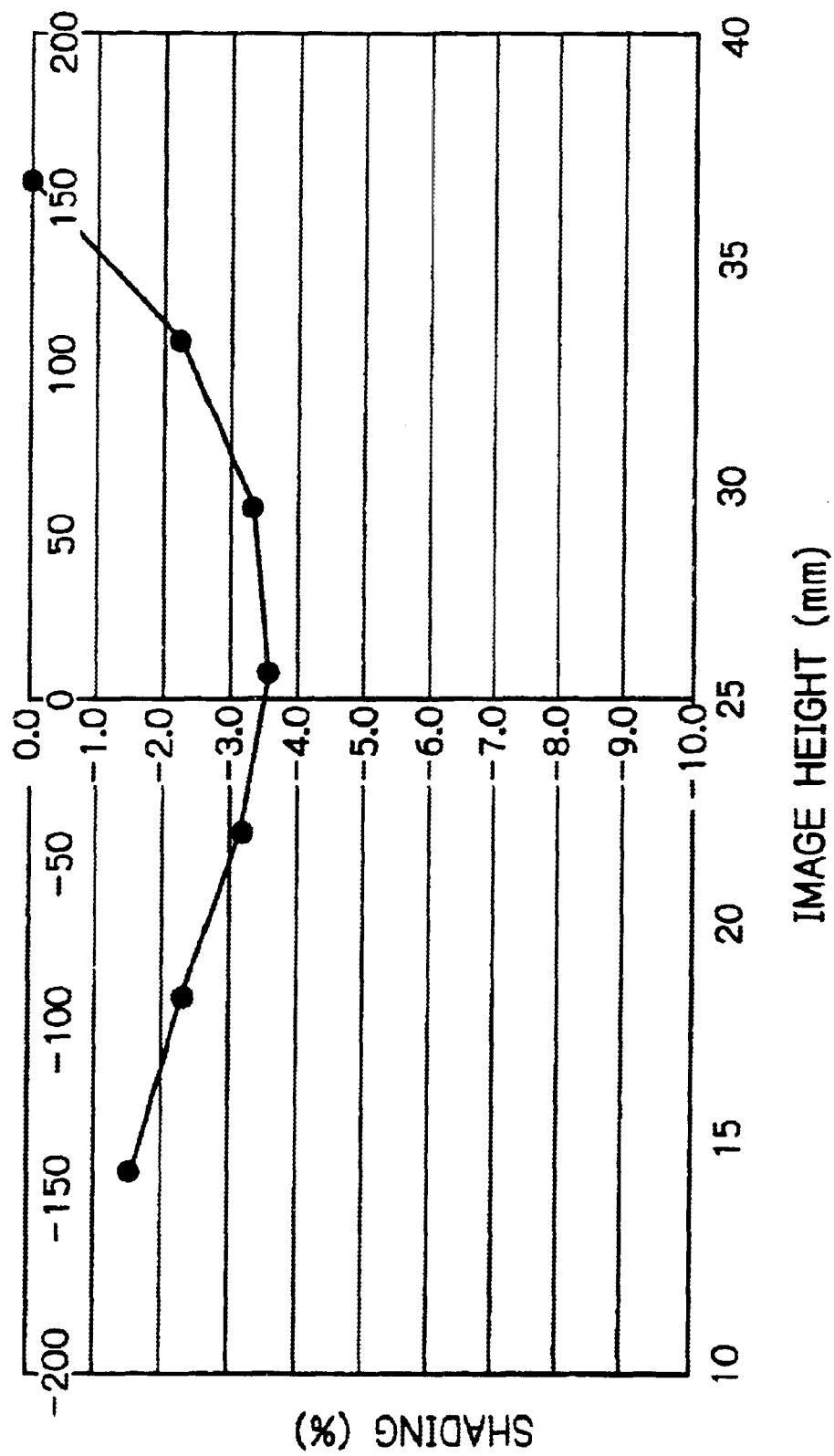
FIG. 9 is a graph showing the shading of the entire optics includes in the illustrative embodiment.

Reference will be made to FIGS. 7 and 8 for describing an optical scanning device embodying the present invention and an image forming apparatus using the same. As shown, the optical scanning device includes a semiconductor laser or light source 1, a coupling lens 12, an aperture 13, a cylindrical lens 14, a polygonal mirror 3, a first lens 6, a second lens 7, a soundproof glass or transparent, parallel flat plate 9, a dustproof glass or another transparent, parallel flat plate 10, a first return mirror 21, a second return mirror 22, and a third return mirror 23. The reference numeral 8 designates a subject surface to be scanned by the scanning device.

The coupling lens 12 converges diverging light issuing from the light source 1 to thereby couple the resulting light beam to optics to follow. The aperture 13 shapes the light beam in section. The cylindrical lens 14 converges the shaped light beam only in the subscanning direction. As a result, an elongate, line image is focused around the deflecting face of the polygonal mirror 3 in a direction corresponding to the main scanning direction. The polygonal mirror 3 in rotation deflects the incident beam over a preselected angular range. The first and second lenses 6 and 7 cooperate to focus the beam on the surface 8 in the form of a beam spot. While the deflecting faces of the polygonal mirror 3 deflect the beam at a constant angular velocity due to the rotation of the mirror 3, the lenses 6 and 7 cause the beam spot to scan the surface 8 at a constant velocity.

The beam incident to the deflecting face of the polygonal mirror or deflector 3 and the optical axis of the focusing optics made up of the lenses 6 and 7 are angularly spaced from each other.

The polygonal mirror 3 is accommodated in a soundproof/dustproof case. The transparent, parallel flat plate 9 extends over the positions where the light beam is input and output from the polygonal mirror 3. More specifically, the light beam propagated from the light source side 1 is incident to the deflecting face 3A of the polygonal mirror 3 via the parallel flat plate 9. The light beam deflected by the above deflecting face 3A is output via the flat plate 9.

As shown in FIG. 8, the first mirror 21 intervenes between the first and second lenses 6 and 7 in order to steer the incident light beam. Likewise, the second and third return mirrors 22 and 23 intervene between the second lens 7 and the surface 8. Further, the transparent, parallel flat plate 10 is positioned between the return mirror 23 and the surface 8.

FIG. 11 shows data relating to the optics following the deflector 3.

In FIG. 11, surfaces with one asterisk are coaxial, aspherical surfaces and expressed as:

$$X = \frac{(Y^2)/R}{1+\sqrt{\{1-(1+K)*(Y/R)^2\}}} + AY^4 + BY^6 + CY^8 + DY^{10} \quad \text{Eq. (1)}$$

As for a surface #1, K is 2.667, A is 1.79E–07, B is –1.08E–12, C is –3.18E–14, and D is 3.74E–18. As for a surface #2, K is 0.02, A is 2.50E–07, B is 9.61E–12, C is 4.54E–15, and D is –3.03E–18.

Surfaces with two asterisks each are non-arcuate in the main scanning direction and have a radius of curvature in the subscanning direction that continuously varies in accordance with the height of the lens.

A surface #3 has a shape represented by the Eq. (1) in a direction corresponding to the main scanning direction; K is –71.73, A is 4.33E–08, B is –5.97E–13, C is –1.28E–16, and D is 5.73E–21. Assume that a distance from the optical axis in a direction corresponding to the main scanning direction is Y, and that a radius of curvature in a plane perpendicular to the deflecting face is Rs (Y) having Y as a variable. Then, Rs(Y) is expressed by a polynomial:

$$Cs(Y)=(1/Rs(0))+\Sigma bj.Yj(j=1, 2, 3, \dots) \quad \text{Eq. (2)}$$

The surface #3 is symmetrical with respect to the optical axis in the direction corresponding to the main scanning direction; Rs(0) is –47.7, B2 is 1.60E–03, B4 is –2.32E–07, B6 is 1.60E–11, B8 is –5.61E–16, B10 is 2.18E–20, and B12 is –1.25E–24.

For the above calculations, a 9 mm thick, soundproof glass (refractive index of 1.511) and a 1.9 mm dustproof glass (refractive index of 1.511 are inserted in the optics.

As for the light source 1, polarization is assumed to be positive when clockwise, as seen from the rear of the light source 1. Assume that just after emission from the light source 1, the light beam has an angle of θ in the direction of polarization relative to the main scanning direction. Then, the angle θ is 17.13°.

Figure 10:
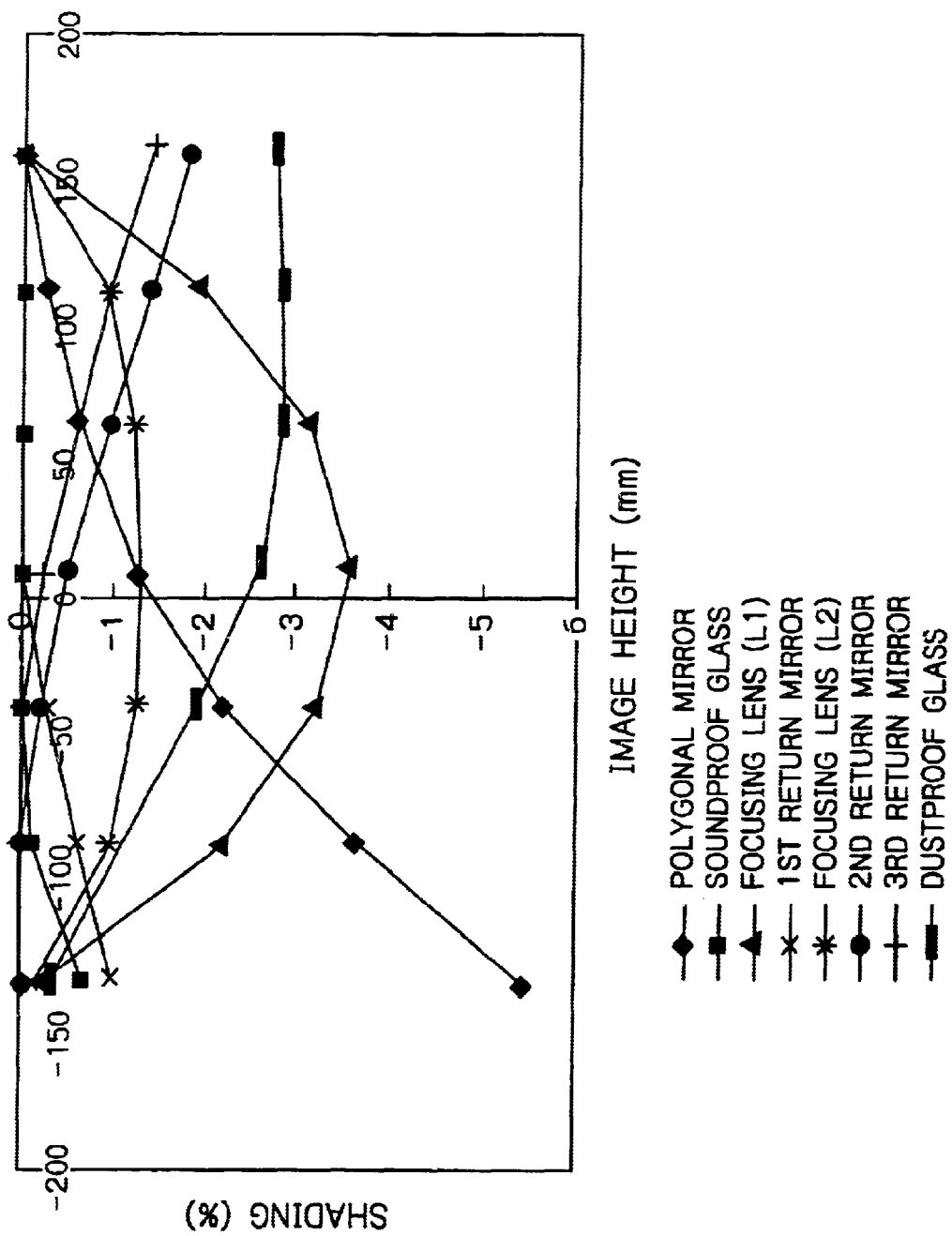
FIG. 10 is a graph showing shading ascribable to the individual optical part.

FIG. 12 shows the coating conditions of the optical elements following the deflector. FIG. 10 plots shading determined with each of the optical elements listed in FIG. 12. As shown, there holds a relation of 0°<θ<45° corresponding to the previously stated condition 1. The polygonal mirror generated upward, rightward shading.

In FIG. 7, an arrow a shows a case wherein a section in the subscanning direction is seen from the side where the beam is incident to the deflecting face 3A while an arrow b shows the case wherein the above section is seen from the opposite side. In FIGS. 7 and 8, the second return mirror 22 is an even reflecting member, as counted from the light source 1 in the direction of beam propagation, except for the deflecting face 3A. The second return mirror 22 is so positioned as to deflect the incident beam clockwise, as seen in the direction a, i.e., as seen from the reverse side of FIG. 8. On the other hand, the third return mirror 23 is an odd reflecting member, as counted from the light source 1 in the direction of beam propagation, except for the deflecting face 3A. The third return mirror 23 is so positioned as to deflect the incident beam counterclockwise, as seen in the direction a, i.e., as seen from the reverse side of FIG. 8. This configuration generates upward, leftward shading to thereby reduce the shading of the entire optics.

The first return mirror 21 is an odd reflecting member, as counted from the light source 1 in the direction of beam propagation, except for the deflecting face 3A. The first return mirror 21 is provided with four coating layers in order to deflect the incident beam clockwise, as seen in the direction a from the side where the light source 1 is located with respect to the section in the subscanning direction that contains the axis of rotation of the deflecting surface 3A, i.e., as seen from the reverse side of FIG. 8. The third return mirror 23 is an odd reflecting member, as counted from the light source 1 in the direction of beam propagation, except for the deflecting face 3A. The third return mirror 23 is provided with two coating layers in order to deflect the incident beam counterclockwise when the section in the subscanning direction is seen from the side where the beam is incident to the deflecting surface 3A, i.e., as seen from the reverse side of FIG. 8. This configuration generates upward, leftward shading and thereby reduces the shading of the entire optics.

Two reflecting members, i.e., the even and odd return mirrors 22 and 23 deflect the incident beam clockwise and counterclockwise, respectively. On the other hand, the single odd mirror 21 deflects the incident light clockwise. This successfully increases the upward, leftward shading and thereby reduces the shading of the entire optics.

An odd number of reflecting members (except for the deflecting surface) exist between the light source 1 and the subject surface 8, as stated above. The soundproof glass 9 is therefore inclined counterclockwise relative to a plane perpendicular to the incident beam when the section in the subscanning direction is seen from the side where the beam is incident to the deflecting surface, i.e., as seen from the reverse side of FIG. 8. This increases the upward, leftward shading to thereby reduce the shading of the entire optics. The soundproof glass 9 is provided with two coating layers. By contrast, the dustproof glass 10 is not provided with any coating layer. This increases the upward, leftward shading to thereby reduce the shading of the entire optics.

Further, the soundproof glass 9 and dustproof glass 10 are inclined by 2° and 17°, respectively. This increases the upward, leftward shading to thereby reduce the shading of the entire optics.

The configurations described above reduce the shading of the entire optics below 4.1%.

Assume that the illustrative embodiment is applied to an image forming apparatus. Then, the surface 8, FIGS. 7 and 8, is the surface of a photoconductive element or image carrier. An electrophotographic process to be executed with the photoconductive element is as follows. The deflected beam scans the charged surface of the element to thereby expose it imagewise. As a result, a latent image is formed on the element. The latent image is developed by toner to become a toner image. The toner image is transferred to a paper sheet or similar recording medium. The toner image is fixed on the paper sheet by heat. After the image transfer, the surface of the element is cleaned and then discharged to be prepared for the next exposure thereby.

While the illustrative embodiment has concentrated on a single light source, the present invention is similarly practicable with optics including a plurality of light sources, e.g., a plurality of semiconductor lasers, an LD (Laser Diode) array or a planar emission laser.

In summary, it will be seen that the present invention provides an optical scanning device capable of reducing the shading of the entire optics thereof. An image forming apparatus using such an optical scanning device can form high-quality images with a minimum of irregular image density.

Various modifications will become possible for those skilled in the art after receiving the teachings of the present disclosure without departing from the scope thereof.

What is claimed is:

1. An optical scanning device comprising:

a light source;

a deflecting surface configured to deflect a light beam output from said light source;

focusing optics configured to focus the light beam deflected by said deflecting surface on a subject surface to be scanned; and at least one reflecting member intervening between said deflecting surface and the subject surface, wherein the light beam incident to said deflecting surface and an optical axis of said focusing optics are angularly spaced from each other in a plane of polarization, wherein when a section in a subscanning direction is seen from a side where the light beam is incident to said deflecting surface, an inclination of said at least one reflecting member relative to a plane perpendicular to said light beam is positive when clockwise and is referred to by $\Theta$, wherein a function f(i) is f(i)=1 when i is an even number or f(i)=−1 when i is an odd number, wherein a direction of polarization of the light beam just after emission from said light source is inclined by an angle of θ relative to a main scanning direction, wherein when a clockwise direction as seen from a rear of said light source is positive, the angle θ lies in a range of:

$$0°<\theta<45° \text{ or } -90°<\theta<45° \quad \text{(condition 1)}$$

or $$-45°<\theta<0° \text{ or } 45°<\theta<90° \quad \text{(condition 2)},$$

wherein when said condition 1 holds, said at least one reflecting member is an "n" reflecting member, as counted from said light source in a direction of propagation of the light beam, except for said deflecting surface and satisfies a relation of f(n)×Θ>0, and wherein when said condition 2 holds, said at least one reflecting member is an "n" reflecting member, as counted from said light source in said direction, except for said deflecting surface and satisfies a relation of f(n)×Θ<0.

2. The device as claimed in claim 1, wherein when said condition 1 holds, said at least one reflecting member is the "n" reflecting member, satisfies said relation of f(n)×Θ>0, and has a number of anti-reflection coating layers smaller than a mean number of anti-reflection coating layers of an "n" reflecting member that satisfies said relation of f(n)×Θ<0, and wherein when said condition 2 holds, said at least one reflecting member is the "n" reflecting member, satisfies said relation of f(n)×Θ<0, and has a number of anti-reflection coating layers smaller than a mean number of anti-reflection coating layers of an "n" reflecting member that satisfies said relation of f(n)×Θ>0.

3. The device as claimed in claim 1, wherein when said condition 1 holds, the "n" reflecting members satisfying said condition of f(n)×Θ>0 are greater in number than the "n" reflecting members satisfying said condition of f(n)×Θ<0, and wherein when said condition 2 holds, the "n" reflecting members satisfying said condition of f(n)×Θ<0 are greater in number than the "n" reflecting members satisfying said condition of f(n)×Θ>0.

4. An optical scanning device comprising:

a light source;

a deflecting surface configured to deflect a light beam output from said light source;

focusing optics configured to focus the light beam deflected by said deflecting surface on a subject surface to be scanned; and at least one transparent, parallel flat plate intervening between said deflecting surface and the subject surface, wherein the light beam incident to said deflecting surface and an optical axis of said focusing optics are angularly spaced from each other in a plane of polarization, wherein when a section in a subscanning direction is seen from a side where the light beam is incident to said deflecting surface, an inclination of said at least one flat plate relative to a plane perpendicular to said light beam is positive when clockwise and is referred to by $\Theta'$, wherein a function f(i) is f(i)=1 when i is an even number or f(i)=−1 and f(0)=1 when i is an odd number, wherein a direction of polarization of the light beam just after emission from said light source is inclined by an angle of θ relative to a main scanning direction, wherein when a clockwise direction as seen from a rear of said light source is positive, the angle θ lies in a range of:

$$0° < θ < 45° \text{ or } -90° < θ < -45° \quad \text{(condition 1)}$$

or $$-45° < θ < 0° \text{ or } 45° < θ < 90° \quad \text{(condition 2)},$$

wherein when said condition 1 holds and when m reflecting members exist between said light source and said at least one flat plate except for said deflecting surface, said at least one flat plate satisfies a relation of f(m)×Θ'>0, and wherein when said condition 2 holds, said at least one flat plate satisfies a relation of f(n)×Θ'<0, wherein m and n are integers equal to or greater than 1.

5. An optical scanning device comprising:

a light source;

a deflecting surface configured to deflect a light beam output from said light source;

focusing optics configured to focus the light beam deflected by said deflecting surface on a subject surface to be scanned; and a plurality of transparent, parallel flat plates intervening between said deflecting surface and the subject surface, wherein the light beam incident to said deflecting surface and an optical axis of said focusing optics are angularly spaced from each other in a plane of polarization, wherein when a section in a subscanning direction is seen from a side where the light beam is incident to said deflecting surface, an inclination of each of said plurality of flat plates relative to a plane perpendicular to said light beam is positive when clockwise and is referred to by Θ', wherein a function f(i) is f(i)=1 when i is an even number or f(i)=−1 and f(0)=1 when i is an odd number, wherein a direction of polarization of the light beam just after emission from said light source is inclined by an angle of θ relative to a main scanning direction, wherein when a clockwise direction as seen from a rear of said light source is positive, the angle θ lies in a range of:

$$0° < θ < 45° \text{ or } -90° < θ < -45° \quad \text{(condition 1)}$$

or $$-45° < θ < 0° \text{ or } 45° < θ < 90° \quad \text{(condition 2)},$$

wherein when said condition 1 holds and when m reflecting members exist between said light source and at least one of said plurality of flat plates except for said deflecting surface, said at least one flat plate satisfies a relation of f(m)×Θ'>0 and has a number of anti-reflection coating layers smaller than, if odd, a mean number of anti-reflection coating layers of another flat plate that satisfies a relation of f(m)×Θ'<0 in a clockwise direction, and wherein when said condition 2 holds, the at least one of said plurality of flat plates satisfies the relation of f(m)×Θ'<0 and has a number of anti-reflection coating layers smaller than, if odd, a mean number of anti-reflection layers of another flat plate that satisfies a relation of f(m)×Θ'>0 in the clockwise direction, wherein m is an integer equal to or greater than 1.

6. An optical scanning device comprising:

a light source;

a deflecting surface configured to deflect a light beam output from said light source;

focusing optics configured to focus the light beam deflected by said deflecting surface on a subject surface to be scanned; and two transparent, parallel flat plates intervening between said deflecting surface and the subject surface, wherein the light beam incident to said deflecting surface and an optical axis of said focusing optics are angularly spaced from each other in a plane of polarization, wherein when a section in a subscanning direction is seen from a side where the light beam is incident to said deflecting surface, an inclination of each of said two flat plates relative to a plane perpendicular to said light beam is positive when clockwise and is referred to by Θ', wherein a function f(i) is f(i)=1 when i is an even number or f(i)=−1 and f(0)=1 when i is an odd number, wherein a direction of polarization of the light beam just after emission from said light source is inclined by an angle of θ relative to a main scanning direction, wherein when a clockwise direction as seen from a rear of said light source is positive, the angle θ lies in a range of:

$$0° < θ < 45° \text{ or } -90° < θ < -45° \quad \text{(condition 1)}$$

or $$-45° < θ < 0° \text{ or } 45° < θ < 90° \quad \text{(condition 2)},$$

wherein when said condition 1 holds and when m reflecting members exist between said light source and each of said two flat plates except for said deflecting surface, said two flat plates both satisfy a relation of f(m)×Θ'>0 or only one of said two flat plates satisfies said relation of f(m)×Θ'>0 and has a greater absolute value of Θ' than the other flat plate, and wherein when said condition 2 holds, said two flat plates both satisfy a relation of f(m)×Θ'<0 or only one of said two flat plates satisfies said relation of f(m)×Θ'>0 and has a greater absolute value of Θ' than the other flat plate, wherein m is an integer equal to or greater than 1.

7. An image forming apparatus comprising:

an image carrier; and an optical scanning device configured to scan a surface of said image carrier with a deflected light beam to thereby form a latent image on said surface;

said optical scanning device comprising:

a light source;

a deflecting surface configured to deflect a light beam output from said light source;

focusing optics configured to focus the light beam deflected by said deflecting surface on the surface of said image carrier; and at least one reflecting member intervening between said deflecting surface and the surface of said image carrier, wherein the light beam incident to said deflecting surface and an optical axis of said focusing optics are angularly spaced from each other in a plane of polarization, wherein when a section in a subscanning direction is seen from a side where the light beam is incident to said deflecting surface, an inclination of said at least one reflecting member relative to a plane perpendicular to said light beam is positive when clockwise and is referred to by $\Theta'$, wherein a function $f(i)$ is $f(i)=1$ when i is an even number or $f(i)=-1$ when i is an odd number, wherein a direction of polarization of the light beam just after emission from said light source is inclined by an angle of $\theta$ relative to a main scanning direction, wherein when a clockwise direction as seen from a rear of said light source is positive, the angle $\theta$ lies in a range of:

$0° < \theta < 45°$ or $-90° < \theta < -45°$     (condition 1)

or $-45° < \theta < 0°$ or $45° < \theta < 90°$     (condition 2), wherein when said condition 1 holds, said at least one reflecting member is an "n" reflecting member, as counted from said light source in a direction of propagation of the light beam, except for said deflecting surface and satisfies a relation of $f(n) \times \Theta' > 0$, and wherein when said condition 2 holds, said at least one reflecting member is an "n" reflecting member, as counted from said light source in said direction, except for said deflecting surface and satisfies a relation of $f(n) \times \Theta' < 0$.

8. An image forming apparatus comprising:

an image carrier; and an optical scanning device configured to scan a surface of said image carrier with a deflected light beam to thereby form a latent image on said surface;

said optical scanning device comprising:

a light source;

a deflecting surface configured to deflect a light beam output from said light source;

focusing optics configured to focus the light beam deflected by said deflecting surface on the surface of said image carrier; and at least one transparent, parallel flat plate intervening between said deflecting surface and the surface of said image carrier, wherein the light beam incident to said deflecting surface and an optical axis of said focusing optics are angularly spaced from each other in a plane of polarization, wherein when a section in a subscanning direction is seen from a side where the light beam is incident to said deflecting surface, an inclination of said at least one flat plate relative to a plane perpendicular to said light beam is positive when clockwise and is referred to by $\Theta'$, wherein a function $f(i)$ is $f(i)=1$ when i is an even number or $f(i)=-1$ and $f(0)=1$ when i is an odd number, wherein a direction of polarization of the light beam just after emission from said light source is inclined by an angle of $\theta$ relative to a main scanning direction, wherein when a clockwise direction as seen from a rear of said light source is positive, the angle $\theta$ lies in a range of:

$0° < \theta < 45°$ or $-90° < \theta < -45°$     (condition 1)

or $-45° < \theta < 0°$ or $45° < \theta < 90°$     (condition 2), wherein when said condition 1 holds and when m reflecting members exist between said light source and said at least one flat plate except for said deflecting surface, said at least one flat plate satisfies a relation of $f(m) \times \Theta' > 0$, and wherein when said condition 2 holds, said at least one flat plate satisfies a relation of $f(n) \times \Theta' < 0$, wherein m and n are integers equal to or greater than 1.

9. An image forming apparatus comprising:

an image carrier; and an optical scanning device configured to scan a surface of said image carrier with a deflected light beam to thereby form a latent image on said surface;

said optical scanning device comprising:

a light source;

a deflecting surface configured to deflect a light beam output from said light source;

focusing optics configured to focus the light beam deflected by said deflecting surface on the surface of said image carrier; and a plurality of transparent, parallel flat plates intervening between said deflecting surface and the surface of said image carrier, wherein the light beam incident to said deflecting surface and an optical axis of said focusing optics are angularly spaced from each other in a plane of polarization, wherein when a section in a subscanning direction is seen from a side where the light beam is incident to said deflecting surface, an inclination of each of said plurality of flat plates relative to a plane perpendicular to said light beam is positive when clockwise and is referred to by $\Theta'$, wherein a function $f(i)$ is $f(i)=1$ when i is an even number or $f(i)=-1$ and $f(0)=1$ when i is an odd number, wherein a direction of polarization of the light beam just after emission from said light source is inclined by an angle of $\theta$ relative to a main scanning direction, wherein when a clockwise direction as seen from a rear of said light source is positive, the angle $\theta$ lies in a range of:

$0° < \theta < 45°$ or $-90° < \theta < -45°$     (condition 1)

or $-45° < \theta < 0°$ or $45° < \theta < 90°$     (condition 2), wherein when said condition 1 holds and when m reflecting members exist between said light source and at least one of said plurality of flat plates except for said deflecting surface, said at least one flat plate satisfies a relation $f(m) \times \Theta' > 0$ and has a number of anti-reflection coating layers smaller than, if odd, a mean number of anti-reflection coating layers of another flat plate that satisfies a relation of $f(m) \times \Theta' < 0$ in a clockwise direction, and wherein when said condition 2 holds, at least one of said plurality of flat plates satisfies the relation of $f(m) \times \Theta' < 0$ and has a number of anti-reflection coating layers smaller than, if odd, a mean number of anti-reflection coating layers of another flat plate that satisfies the relation of $f(m) \times \Theta' > 0$ in the clockwise direction, wherein m is an integer equal to or greater than 1.

10. An image forming apparatus comprising:

an image carrier; and an optical scanning device configured to scan a surface of said image carrier with a deflected light beam to thereby form a latent image on said surface;

said optical scanning device comprising:

a light source;

a deflecting surface configured to deflect a light beam output from said light source;

focusing optics configured to focus the light beam deflected by said deflecting surface on the surface of said image carrier; and two transparent, parallel flat plates intervening between said deflecting surface and the surface of said image carrier, wherein the light beam incident to said deflecting surface and an optical axis of said focusing optics are angularly spaced from each other in a plane of polarization, wherein when a section in a subscanning direction is seen from a side where the light beam is incident to said deflecting surface, an inclination of each of said two flat plates relative to a plane perpendicular to said light beam is positive when clockwise and is referred to by $\Theta'$, wherein a function $f(i)$ is $f(i)=1$ when i is an even number or $f(i)=-1$ and $f(0)=1$ when i is an odd number, wherein a direction of polarization of the light beam just after emission from said light source is inclined by an angle of $\theta$ relative to a main scanning direction, wherein when a clockwise direction as seen from a rear of said light source is positive, the angle $\theta$ lies in a range of:

$$0° < \theta < 45° \text{ or } -90° < \theta < -45° \qquad \text{(condition 1)}$$

or $$-45° < \theta < 0° \text{ or } 45° < \theta < 90° \qquad \text{(condition 2)},$$

wherein when said condition 1 holds and when m reflecting members exist between said light source and each of said two flat plates except for said deflecting surface, said two flat plates both satisfy a relation of $f(m) \times \Theta' > 0$ or only one of said two flat plates satisfies said relation of $f(m) \times \Theta' > 0$ and has a greater absolute value of $\Theta'$ than the other flat plate, and wherein when said condition 2 holds, said two flat plates both satisfy a relation of $f(m) \times \Theta' < 0$ or only one of said two flat plates satisfies said relation of $f(m) \times \Theta' < 0$ and has a greater absolute value of $\Theta'$ than the other flat plate, wherein m is an integer equal to or greater than 1.

* * * * *